April 23, 1957  J. H. McCORNACK ET AL  2,790,048
MERCURY COLUMN THERMOSTAT
Filed Jan. 9, 1956

Inventor
John H. McCornack and
Everett S. Davis,
By R. S. Bent
Attorney

United States Patent Office 2,790,048
Patented Apr. 23, 1957

2,790,048

MERCURY COLUMN THERMOSTAT

John H. McCornack and Everett S. Davis,
Grass Valley, Calif.

Application January 9, 1956, Serial No. 558,076

4 Claims. (Cl. 200—141)

This invention relates to a thermostat of the mercury to wire type adapted for use in electrically operated temperature controls.

A particular object of the invention is to provide a thermostat of the above character embodying a construction whereby it may be adjusted or set to operate at various temperatures.

Another object is to provide a mercury controlled or actuated thermostat in which the mercury element is contained in a shatter proof housing fitted with a pair of spaced electrodes for connection in or with the terminals of a pair of electrical conductors with one of the electrodes leading to the mercury body and the other electrode normally spaced from but lying in the path of an ascending mercury column and wherein means are provided for varying relative spacing of the last named electrode and the mercury column.

Figure 1:
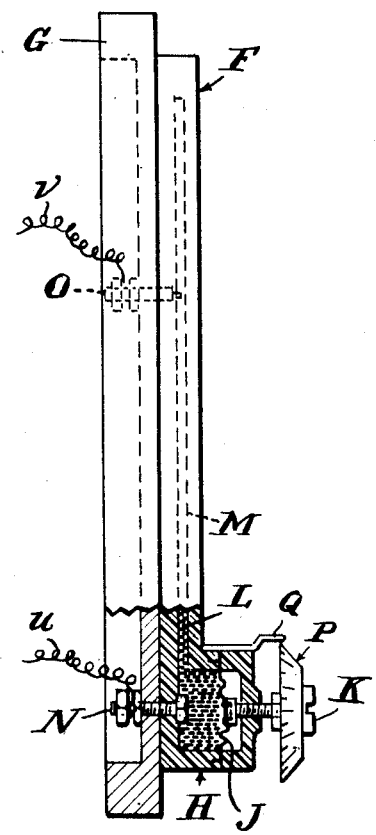
Figure 2:
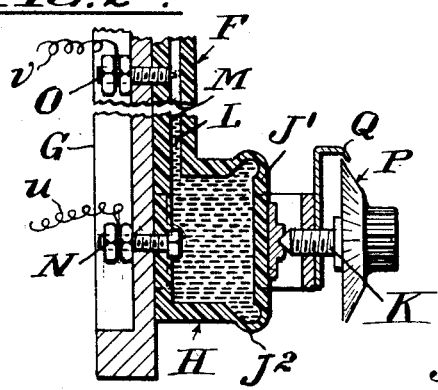

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view in side elevation partly in vertical section illustrating a form of the invention in which the thermostat is equipped with an adjustable mercury cistern for manually varying the height of the mercury column; and Fig. 2 is a fragmentary view in vertical section showing a modified form of the thermostat shown in Fig. 1.

In the form of the invention shown in Fig. 1, a capillary tube F mounted on a panel G is fitted at its lower end with a mercury containing cistern H one wall of which comprises a diaphragm J connected to a screw K extending through a fixed wall paralleling the diaphragm in threaded engagement therewith and by which the diaphragm may be flexed by advancing or retracting the screw K to vary the capacity of the cistern H and thereby vary the level of the mercury column L in the capillary bore M. An electrode N leads through the panel G into the cistern H to effect electrical connection with the mercury body contained therein and a second electrode O extends through the panel G into the capillary tube M at a point normally above the level of the mercury column in the latter and adapted to make electrical connection therewith on the mercury being elevated under its expansion by rise in temperature. Electrical conductors $u$ and $v$ lead from the electrodes N and O respectively for connection with an electric circuit containing instrumentalities to be controlled by the thermostat.

The screw K is fitted with a calibrated disk P which is readable in conjunction with a fixed pointer Q to indicate the reading of the temperature at which the thermostat is to operate to close the electrical circuit through the electrodes N and O; the disk P being turned with the screw K on rotating the latter in effecting variation in the level of the mercury column to vary the distance between the upper end of the column and the electrode O. Manifestly the amount of increase in temperature required to actuate the thermostat is dependent upon the distance between the upper end of the mercury column and the electrode O, the shorter this distance the less increase in temperature required and conversely the greater the distance the greater will be the thermostat operative temperature. By adjusting the screw K according to a reading of the calibrated disk P the upper end of the mercury column L may be set at a predetermined position relative to the electrode O to effect operation of the thermostat at a selected temperature.

In the modified construction shown in Fig. 2 wherein corresponding reference characters indicate corresponding parts shown in Fig. 1 the cistern H is formed with a rigid front wall J' which is connected throughout its margin to the contiguous rigid side wall by a thin flexible wall J² so that the wall J' may be moved inwardly under the thrust of a screw K and moved outwardly on retraction of the screw under the load imposed thereon by the body of mercury contained in the cistern, the screw K being threaded through a fixed wall paralleling the wall J' in independent relation thereto. By adjustment of the screw K the level of the mercury in the capillary tube R may be varied in the manner above described.

From the foregoing it will be seen that the mercury controlled thermostat constructed as herein set forth is subject to being readily adjusted to operate at various selected temperatures.

The thermostat is particularly applicable for use in air conditioning systems, in controlling electrically actuated burners, fuel feed valves, dampers and the like, in a fashion incident to the common use of thermostats.

I claim:

1. In a thermostat embodying a tube of relatively small cross section, a cistern of relatively large cross section connected with said tube and having a flexible wall, a body of conductive liquid which changes volume with changes in temperature disposed in said cistern and tube, a first electrical contact disposed in permanent contact with the body of liquid, and a second electrical contact disposed in the tube with which said body of liquid comes into contact when the volume of the liquid increases; a screw, a mounting therefor, said screw being directly engageable with said flexible wall for adjusting the latter to vary the capacity of said cistern, and indicator means carried in part by said screw and operable thereby for indicating the operative temperature setting of the thermostat.

2. In a thermostat embodying a tube of relatively small cross section, a cistern of relatively large cross section connected with said tube and having a flexible wall, a body of conductive liquid which changes volume with changes in temperature disposed in said cistern and tube, a first electrical contact disposed in permanent contact with the body of liquid, and a second electrical contact disposed in the tube with which said body of liquid comes into contact when the volume of the liquid increases; a screw, a mounting therefor, said screw being directly engageable with said flexible wall for adjusting the latter to vary the capacity of said cistern, a fixed pointer adjacent said cistern, and an indicator element carried by said screw carrying calibrations designated by said pointer to indicate the operative temperature setting of the thermostat.

3. In a thermostat embodying a tube of relatively small cross section, a cistern of relatively large cross section connected with said tube and having a flexible wall, a body of conductive liquid which changes volume with changes in temperature disposed in said cistern and tube, a first electrical contact disposed in permanent contact with the body of liquid, and a second electrical contact disposed in the tube with which said body of liquid comes into contact when the volume of the liquid increases; said flexible wall comprising a diaphragm, a fixed wall paralleling said diaphragm, a screw extending through said wall in threaded engagement therewith and connected to said diaphragm for flexing the latter to thereby vary the capacity of said cistern.

4. In a thermostat embodying a tube of relatively small cross section, a cistern of relatively large cross section connected with said tube, a body of conductive liquid which changes volume with changes in temperature disposed in said cistern and tube, a first electrical contact disposed in permanent contact with the body of liquid, and a second electrical contact disposed in the tube with which said body of liquid comes into contact when the volume of the liquid increases; said cistern having a rigid side wall and a rigid front wall, said front wall being connected throughout its margin to said side wall by a thin flexible wall, a fixed wall paralleling said front wall, and a screw extending through said fixed wall in threaded engagement therewith and bearing on said front wall; said screw being operable to vary the position of said front wall and thereby vary the capacity of said cistern.

References Cited in the file of this patent

UNITED STATES PATENTS

| | | |
|---|---|---|
| 2,113,326 | Krog | Apr. 5, 1938 |
| 2,460,134 | Lee | Jan. 25, 1949 |
| 2,745,925 | Liberatore et al. | May 15, 1956 |